Jan. 2, 1968 KENJI TAKAHASHI 3,361,994

COMPACT TUNING FORK RESONATOR

Filed Aug. 13, 1964

United States Patent Office 3,361,994
Patented Jan. 2, 1968

3,361,994

COMPACT TUNING FORK RESONATOR

Kenji Takahashi, Tokyo-to, Japan, assignor to Kokusai Denki Kabushiki Kaisha, Tokyo-to, Japan, a joint-stock company of Japan Filed Aug. 13, 1964, Ser. No. 389,384
Claims priority, application Japan, Aug. 23, 1963, 38/43,938
4 Claims. (Cl. 333—71)

ABSTRACT OF THE DISCLOSURE

A tuning fork resonator in which the tuning fork structure is miniaturized or made compact without loss in Q. The embodiments have the fork prongs free ends reversely bent with the bent portions bent backwardly parallel with the prongs. One embodiment has two tuning forks in a single integral tuning fork structure in which one bent prong is split and has a longitudinal slot extending from the extreme free end to a nodal point thereby effectively separating the one prong into two prongs. The other prong is common to the split prong or separated prongs and has an input or driving transducer attached thereto. Each part of the split prong has a pickoff transducer for taking out output having a relative phase difference of pi radians and electrically in parallel.

Figure 1B:
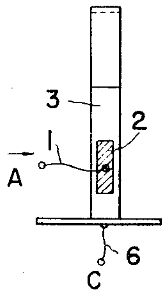

This invention relates to improvements in tuning forks designed to function as low-frequency filtering elements.

It is an object of the invention to provide a miniature, highly stable, and economical tuning fork.

Briefly stated, the invention contemplates the provision of a miniature and stable construction for tuning forks of the type stated above by bending back the prongs or vibration loop parts of a tuning fork, as viewed in the longitudinal direction, through substantially 180 degrees of bending angle, thereby shortening the total length of the tuning fork without lowering the mechanical Q of the tuning fork vibration.

In another aspect of the invention, it contemplates the provision of a tuning fork vibration or resonator of the abovedescribed character wherein one of two prongs is provided with a longitudinal slot from its extreme free end to its nodal point, whereby it is divided into two separated prongs which, in respective combinations with the other unseparated, common prong, form two tuning forks in a single, integral structure.

Figure 1A:
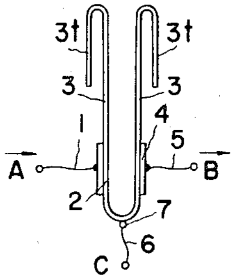
Figure 1C:
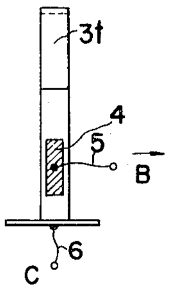
Figure 2B:
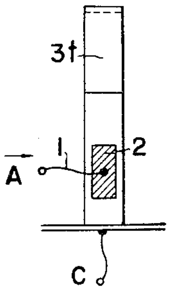
Figure 2A:
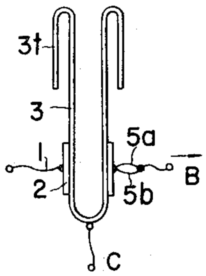
Figure 2C:
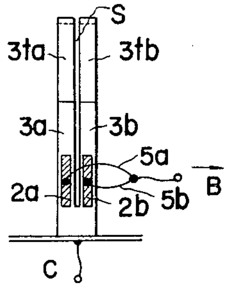
Figure 3:
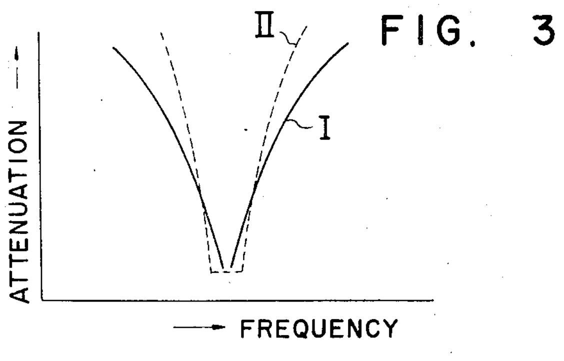

The specific nature, principle and details of the invention will be more clearly apparent by reference to the following description with respect to preferred embodiments of the invention, when taken in conjunction with the accompanying drawing in which like parts are designated by like reference characters, and in which:

FIGS. 1*a*, 1*b* and 1*c* are three diagrammatic views showing a single-resonant tuning fork embodying the invention, center FIG. 1*a* is a front elevational view, and right and left FIGS. 1*a* and 1*b* are, respectively, right side and left side views;

FIGS. 2*a*, 2*b* and 2*c* are similar views showing a differentially coupled, double-resonant tuning fork embodying the invention, in which center FIG. 2*a* is a front elevation view, and right and left FIG. 2*c* and 2*b* are respectively, right side and left side views; and FIG. 3 is a graphical representation of curves indicating the filter characteristics respectively of tuning fork vibrators of the constructions shown in FIGURES 1 and 2.

Referring first to FIGS. 1*a*, 1*b*, and 1*c*, the single-resonant tuning fork vibrator shown therein is provided with an input terminal A through which input signals transmitted through a lead 1 are applied to a piezoelectric element 2. The piezoelectric element 2, which consists of a lead titanate-zirconate ceramic and has been fabricated by heat-bonding silver electrodes on two opposite sides thereof and by ample polarization treatment, is bonded onto one prong 3 of the tuning fork at a position in the vicinity of its node.

When the impressed frequency at the piezoeelctric element 2 coincides with the resonance frequency of the tuning fork, the tuning fork vibrates with a large amplitude. The output due to this vibration is extracted by another piezoelectric element 4 on the output side (on the other prong of the tuning fork) and is transmitted through a lead 5 to an output terminal B.

The tuning fork is supported at the center of its lowest part by a support member 7, which is mounted on a suitable vibration-resistant material (not shown). By brazing a lead 6 to this support member 7, it is possible to maintain this member at a stable grounded (earthed) potential.

The free ends $3_t$ of the tuning fork prongs 3 are bent back outwardly as viewed in the longitudinal directions as shown in FIG. 1*a*. In this case, the bent back parts $3_t$ have the function, as a stable top load, of lowering the frequency of the vibrator, and this construction, moreover, affords substantial miniaturization.

Another embodiment of the invention as applied to a differential coupled, double resonant tuning fork is shown in FIGS. 2*a*, 2*b*, and 2*c*, in which parts similar to those shown in FIGURE 1 are designated by the same reference characters. The tuning fork shown in FIGS. 2*a*, 2*b*, 2*c* differs from that shown in FIGS. 1*a*, 1*b*, 1*c*, in the following constructional details. One prong (the right-hand prong as shown in the center view of FIG. 2*a*) is provided with a longitudinal slot extending from its extreme free end to its lower part, whereby the prong is divided into two parts $3_a$ and $3_b$ provided, respectively, with the bent back parts $3_{ta}$ and $3_{tb}$. The resulting separated prongs $3_a$ and $3_b$ and the common reed 3 on the left-hand side afford the vibrations of two tuning forks with a single structure.

That is, the vibrations of these two tuning forks are mechanically coupled by their common nodal part (the lowest part as viewed in FIG. 2), this mechanical coupling being extremely weak and being unaffected by the output transmission pass band. The separated prongs are respectively provided at their nodal parts with piezoelectric elements $2_a$ and $2_b$, one of which is connected with reversed polarity of polarization with respect to that of the other.

When an input signal is applied to the piezoelectric element 2, there are produced compounded vibrations of the tuning fork consisting of the common prong 3 and the separated prong $3_a$ and that consisting of the common prong 3 and the separated prong $3_b$. In this case, by so constructing the tuning fork that the frequencies of these vibrations mutually differ by from 0.1 to 1 percent, outputs whose frequencies mutually differing by from 0.1 to 1 percent are produced at the corresponding piezoelectric elements. Then, since the respective outputs are of mutually inverse phase, if these outputs are combined by means of leads $5_a$ and $5_b$ as shown in FIGS. 2*a*, 2*b*, 2*c*, a band-pass filter of from 0.1 to 1 percent at fractional band width will be formed, and the two outputs will be differentially coupled and transmitted to the output terminal B.

Example filtering characteristics of tuning fork vibrators of the arrangements shown in the various FIGS. 1 and 2 are indicated in FIGURE 3, in which the dotted line curve II illustrating the characteristic of the differentially coupled tuning fork shown in FIG. 2 indicates the excellence of this type of tuning fork having a flat transmission band and exhibiting a steep attenuation characteristic, comparing with the real line curve I showing the single tuning fork characteristics.

As described above, by the practice of the present invention, a low-frequency tuning fork having the advantage of miniature size can be obtained in a very simple manner by fabrication which involves merely the bending of material in plate form.

It should be understood, of course that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. A tuning fork resonator for accomplishing driving and picking up signals through piezoelectric elements, comprising: two prongs having free ends bent back in a longitudinal direction of the prongs and each having a respective reasonant frequency, one of said prongs having a slot in the longitudinal direction thereof from its extreme free end to a nodal part, whereby said prong is divided into two separated prongs, and another prong common to said separated prongs, whereby with a single, integral structure, two tuning fork vibrations are obtained from two tuning forks consisting of combinations of the two separated prongs, respectively with the other unseparated, common prong; and piezoelectric elements fixed to a respective nodal part of each of the prongs, the piezoelectric elements on the separated prongs comprising pickoff means of mutually reversed polarity of polarization, and taking out outputs of said two tuning forks having a relative phase difference of $\pi$ radians and electrically in parallel.

2. A tuning fork resonator for accomplishing driving and picking up signals through piezoelectric elements, comprising: two prongs have free ends bent back in the longitudinal direction of the prongs and each having respective resonant frequency, one of said prongs having a slot in the longitudinal direction thereof from its extreme free end to its nodal point, whereby said prong is divided into two separated prongs, and another prong common to said separated prongs, whereby with a single, integral structure, two tuning fork vibrations are obtained from two tuning forks consisting of combinations of the separated prongs respectively, with the other unseparated, common prong; and piezoelectric elements fixed to a respective nodal part of each of the prongs and the piezoelectric elements on the separated prongs comprising pickoff means of mutually reversed polarity of polarization for taking out outputs of said two tuning forks having a relative phase difference of $\pi$ radians and electrically in parallel.

3. A compact tuning fork resonator comprising, a single integral tuning fork structure functioning as two tuning forks, said tuning fork structure having two resonant prongs, each prong having a free end portion reversely bent and parallel with the prong, one of the prongs having a longitudinal slot extending from a free end thereof to a nodal point effectively dividing the one prong into separate prongs each having a respective resonant frequency, transducer means to apply driving signals to the tuning fork resonator, and pickoff means comprising transducer means on each of said separate prongs for picking off signals from said separate prongs and taking them out as parallel outputs, whereby said single integral tuning fork structure functions as two tuning forks having a common prong.

4. A compact tuning fork resonator according to claim 3, in which said pickoff means comprise means for taking out said outputs having a relative phase difference of $\pi$ radians and in parallel.

References Cited

UNITED STATES PATENTS

| | | | |
|---|---|---|---|
| 375,654 | 12/1887 | Segrove | 84—409 |
| 1,653,794 | 12/1927 | Whitehorn | 84—409 |
| 2,497,143 | 2/1950 | Shonnard | 84—409 |
| 2,875,353 | 2/1959 | Cavalieri et al. | 333—72 |
| 3,303,705 | 2/1967 | Dostal | 84—409 X |

ELI LIEBERMAN, *Primary Examiner.*